(12) United States Patent
Nagatomo

(10) Patent No.: US 11,544,651 B2
(45) Date of Patent: Jan. 3, 2023

(54) ELECTRONIC MANUAL SYSTEM FOR MACHINE TOOL

(71) Applicant: MAKINO MILLING MACHINE CO., LTD., Tokyo (JP)

(72) Inventor: Tomofumi Nagatomo, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/647,335

(22) PCT Filed: Sep. 15, 2017

(86) PCT No.: PCT/JP2017/033585
§ 371 (c)(1),
(2) Date: Mar. 13, 2020

(87) PCT Pub. No.: WO2019/053899
PCT Pub. Date: Mar. 21, 2019

(65) Prior Publication Data
US 2021/0049534 A1    Feb. 18, 2021

(51) Int. Cl.
*G06Q 10/06* (2012.01)
*G06Q 10/10* (2012.01)
(Continued)

(52) U.S. Cl.
CPC ... *G06Q 10/06316* (2013.01); *G05B 19/4166* (2013.01); *G06F 16/93* (2019.01);
(Continued)

(58) Field of Classification Search
CPC .. G06Q 10/06316; G06Q 10/10; G06Q 10/20; G06F 16/93; G06F 16/955;
(Continued)

(56) References Cited

U.S. PATENT DOCUMENTS

2003/0046351 A1    3/2003   Maruyama et al.
2003/0220809 A1    11/2003  Komine et al.
(Continued)

FOREIGN PATENT DOCUMENTS

JP    2002-14986 A    1/2002
JP    2003-196412 A   7/2003
(Continued)

OTHER PUBLICATIONS

International Search Report and Written Opinion dated Dec. 5, 2017, directed to PCT Application No. PCT/JP2017/033585; 15 pages.

*Primary Examiner* — Tadesse Hailu
*Assistant Examiner* — Darrin Hope
(74) *Attorney, Agent, or Firm* — Morrison & Foerster LLP

(57) ABSTRACT

An electronic manual system for a machine tool: generates an inquiry code on the basis of information relating to a user including a manufacture number of a machine tool; refers, on the basis of the inquiry code, to a user information database in which information relating to the machine tool and user identification information are associated with each other and stored; acquires, from an instruction manual database which stores electronic data of an instruction manual for the machine tool possessed by the user, a corresponding electronic manual; and displays the electronic manual on a manual display terminal.

4 Claims, 6 Drawing Sheets

(51) Int. Cl.
*G06Q 10/00* (2012.01)
*G06F 16/93* (2019.01)
*G06F 16/955* (2019.01)
*G05B 19/416* (2006.01)
*G06F 3/0482* (2013.01)
*G06F 3/0488* (2022.01)

(52) U.S. Cl.
CPC ........... *G06F 16/955* (2019.01); *G06Q 10/10* (2013.01); *G06Q 10/20* (2013.01); *G05B 2219/43152* (2013.01); *G06F 3/0482* (2013.01); *G06F 3/0488* (2013.01)

(58) Field of Classification Search
CPC . G06F 3/0482; G06F 3/0488; G05B 19/4166; G05B 2219/43152
See application file for complete search history.

(56) References Cited

U.S. PATENT DOCUMENTS

| | | | |
|---|---|---|---|
| 2010/0169290 A1* | 7/2010 | McCoy | H04L 67/125 707/705 |
| 2013/0058622 A1 | 3/2013 | Olson et al. | |
| 2016/0203232 A1* | 7/2016 | O'Brien | B29C 33/70 235/375 |
| 2016/0292428 A1* | 10/2016 | Brady | G06F 21/629 |

FOREIGN PATENT DOCUMENTS

| | | |
|---|---|---|
| JP | 2003-271613 A | 9/2003 |
| JP | 2003-345418 A | 12/2003 |
| JP | 2012-108662 A | 6/2012 |

\* cited by examiner

ELECTRONIC MANUAL SYSTEM FOR MACHINE TOOL

CROSS-REFERENCE TO RELATED APPLICATIONS

This application is a U.S. national phase patent application of International Patent Application No. PCT/JP2017/033585 filed Sep. 15, 2017, which is hereby incorporated by reference in the present disclosure in its entirety.

FIELD OF THE DISCLOSURE

The present invention relates to a machine tool electronic manual system which acquires an electronic manual from a network-connected server and displays the electronic manual on a manual display terminal.

BACKGROUND OF THE DISCLOSURE

Since machine tools have a wide variety of specifications, mechanisms, and functions and are complicated, the instruction manuals therefor become enormous. Thus, there is a problem in that it is difficult to manage paper instruction manuals of machine tools, and instructions manuals are conventionally provided in the form of electronic data.

Patent Literature 1 describes a document revision/distribution management system comprising a distribution server comprising a product element/partial document version correspondence table which manages product elements constituting a product and partial documents constituting a total document with version correspondence, and a final product/delivery destination management table which manages the destination to which the final product appropriately using the product elements constituting the product has been delivered with final product correspondence or a total document/destination management table which manages the total document corresponding to the final product for each destination, wherein revised distributions of necessary partial documents are transmitted to the necessary delivery destination.

Patent Literature

[PTL 1] Japanese Unexamined Patent Publication (Kokai) No. 2002-014986

SUMMARY OF THE DISCLOSURE

Though the document revision/distribution management system described in Patent Literature 1 can distribute revised instruction manuals, finding necessary information from among the huge amount of electronic data is a difficult and time-consuming task.

The present invention aims to solve such problems of the prior art, and aims to provide a machine tool electronic manual system with which operators can easily display information related to the inspection and maintenance of machine tools in accordance with the situation.

In order to achieve the above object, according to the present invention, there is provided a machine tool electronic manual system which acquires from a network-connected server and displays an electronic manual including information associated with operations and maintenance of a machine tool, the system comprising a server having a user information database which stores at least machine tool information and user identification information in association with each other, and an instruction manual database which stores electronic data of instruction manuals of a plurality of models of machine tools operated by a user, an inquiry code generation unit which generates an inquiry code based on information about the user including at least a machine tool serial number, a communication unit which acquires a corresponding electronic manual from the instruction manual database based on the inquiry code referring to the user information database, and a manual display terminal having a manual display unit which displays the electronic manual acquired by the communication unit.

According to the present invention, since an inquiry code is read into the manual display terminal and an instruction manual is displayed on the manual display terminal, the operator can read the information related to the operation to solve issues which have occurred in the machine tool or inspection/maintenance tasks at the location at which the task is performed.

DETAILED DESCRIPTION OF THE DISCLOSURE

Figure 1:
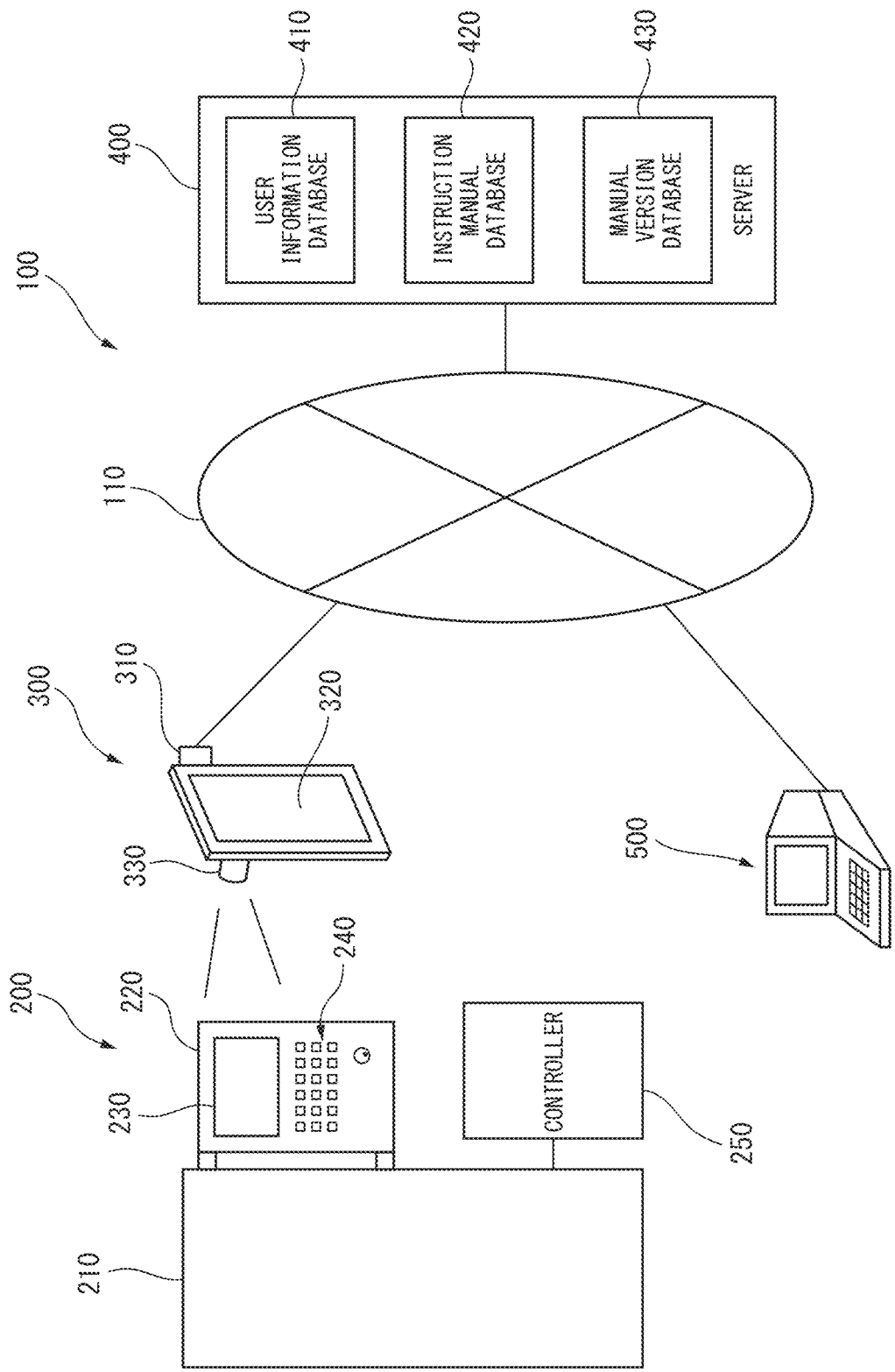
FIG. 1 is a schematic block diagram showing the machine tool electronic manual system according to an embodiment of the present invention.

Referring to FIG. 1, the machine tool electronic manual system 100 according to a preferred embodiment of the present invention comprises a machine tool 200, a manual display terminal 300 constituted by a tablet or smartphone, and a server 400 which stores the electronic data of the instruction manual of the machine tool 200. The manual display terminal 300 includes a wireless communication unit 310, a display unit 320 such as a touch panel, and a camera 330. The manual display terminal 300 can access the server 400 via the Internet 110 by means of the wireless communication unit 310.

The machine tool 200 comprises, for example, a machining device 210 in which a tool is mounted on the tip of a rotatably supported spindle and which machines a workpiece into a desired shape by moving the tool and the workpiece relative to each other with a feed device while bringing the workpiece and rotating tool into contact with each other, a tool magazine (not illustrated) for storing the rotary tools used in the machining device 210, an automatic tool exchange device (not illustrated) which exchanges tools between the machining device 210 and the tool magazine, a pallet exchange device (not illustrated) which supplies and removes pallets (not illustrated) to which workpieces are attached to and from the table of the machining device 210, an oil-air supply device (not illustrated) which supplies mist-like lubricating oil to the machining device 210, and a compressed air supply device (not illustrated) which supplies compressed air to the machining device 210. The machine tool 210 can be a machining center which is controlled by a controller 250.

The controller 250 includes an NC device (not illustrated) which controls the feed device of the machining device 210, and a machine controller which controls the tool magazine, the automatic tool exchange device, the oil-air supply device, the compressed air supply device, etc.

The machine tool 200 further comprises an operation board 220 with which the operator can operate the machine tool 200. The operation board 220 includes a display unit 230 and operation buttons 240. The display unit 230 can be a touch panel with which desired portions can be selected by touching the screen. The controller 250 of the machine tool 200, in particular the machine controller, comprises a storage device (not illustrated) which stores user identification information such as the URL of the server 400, usernames, and passwords for accessing the server 400. Furthermore, the machine controller comprises an inquiry code generation unit, which is described later. It should be noted that in the present embodiment, the machine tool 200 is not connected to the Internet 110 for security reasons, such as the prevention of information leaks and the prevention of malfunctions of the machine due to unauthorized access. The machine tool 200 is operated in a stand-alone mode without connection to a network or in a state in which it is connected to a LAN independent of the Internet in a factory.

The server 400 includes a user information database 410, an instruction manual database 420, and a manual version database 430. The user information, which includes the model numbers, serial numbers, and specifications/optional functions of the various machine tools operated by the user, is stored in the user information database 410 in association with the username or user account. Conventionally, the provider of the server 400 is the manufacturer of the machine tool 200, but a supplier who is not the manufacturer of the machine tool may be a server provider tasked with the management of electronic manuals from a plurality of machine tool manufacturers.

The electronic data of the instruction manuals is stored in the instruction manual database 420 in association with the model numbers, serial numbers, and specifications/optional functions of the machine tools and the versions or manual identification codes of the instruction manuals. Furthermore, the electronic data of the instruction manuals stored in the instruction manual database 420 can be stored and divided into a plurality of electronic files for each item by associating them with a plurality of items corresponding to large, medium and small items in the table of contents of the instruction manual, rather than as a single electronic file containing all of the contents of the instruction manual. The electronic file for each item is called a partial manual electronic file.

Such partial manual electronic files can be, for example, PDF files containing photographs of the device units constituting the machine tool 200 and descriptions thereof. Furthermore, in addition to such partial manual electronic files including photographs of each item and descriptions thereof, video files recording the operations to resolve malfunctions of the machine tool 200 and inspection/maintenance operations of the equipment units constituting the machine tool 200 may be stored in the instruction manual database 420 in association with the model number, serial number, and specification/optional functions of the machine tool as well as the version or manual identification code of the instruction manual. Further, such electronic files for each item are stored in association with alarm codes and inspection item codes, which are described later, in addition to the items. It should be noted that the partial manual electronic files are not limited to PDF files, but may be HTML files.

The versions or manual identification codes of all of the instruction manuals transferred or lent to the user are stored in the manual version database 430 in association with the account or username of the user and the models or serial numbers of the machine tools operated or managed by the user. When the machine tool having the same model number is a machine tool having one or more optional functions added to the standard functions or a special specification machine tool, the instruction manuals can include, in addition to shared instruction manuals which are common to machine tools having the same model number, special instruction manuals which are created as an additional separate volume corresponding to such optional functions and special specifications.

In FIGS. 2 to 5, when the operator operates the electronic manual, a main window 10 for displaying information related to the machine tool is displayed on the display unit 230 of the operation board 220. The main window 10 includes at least an alarm window 20, which is described later, a display area 18 which displays a periodic inspection window 30 or the like, an inspection button 12, and an inquiry code generation button 14.

The controller 250 of the machine tool 200 continuously monitors each part of the machine tool 200 when the power is turned on and generates an alarm when a malfunction occurs in any of the parts of the machine tool 200. In particular, in the present embodiment, as shown in FIG. 2, the alarm window 20 is displayed in the main window 10 on the display unit 230, whereby the operator can be notified of the occurrence of malfunctions in the machine tool 200.

Figure 2:
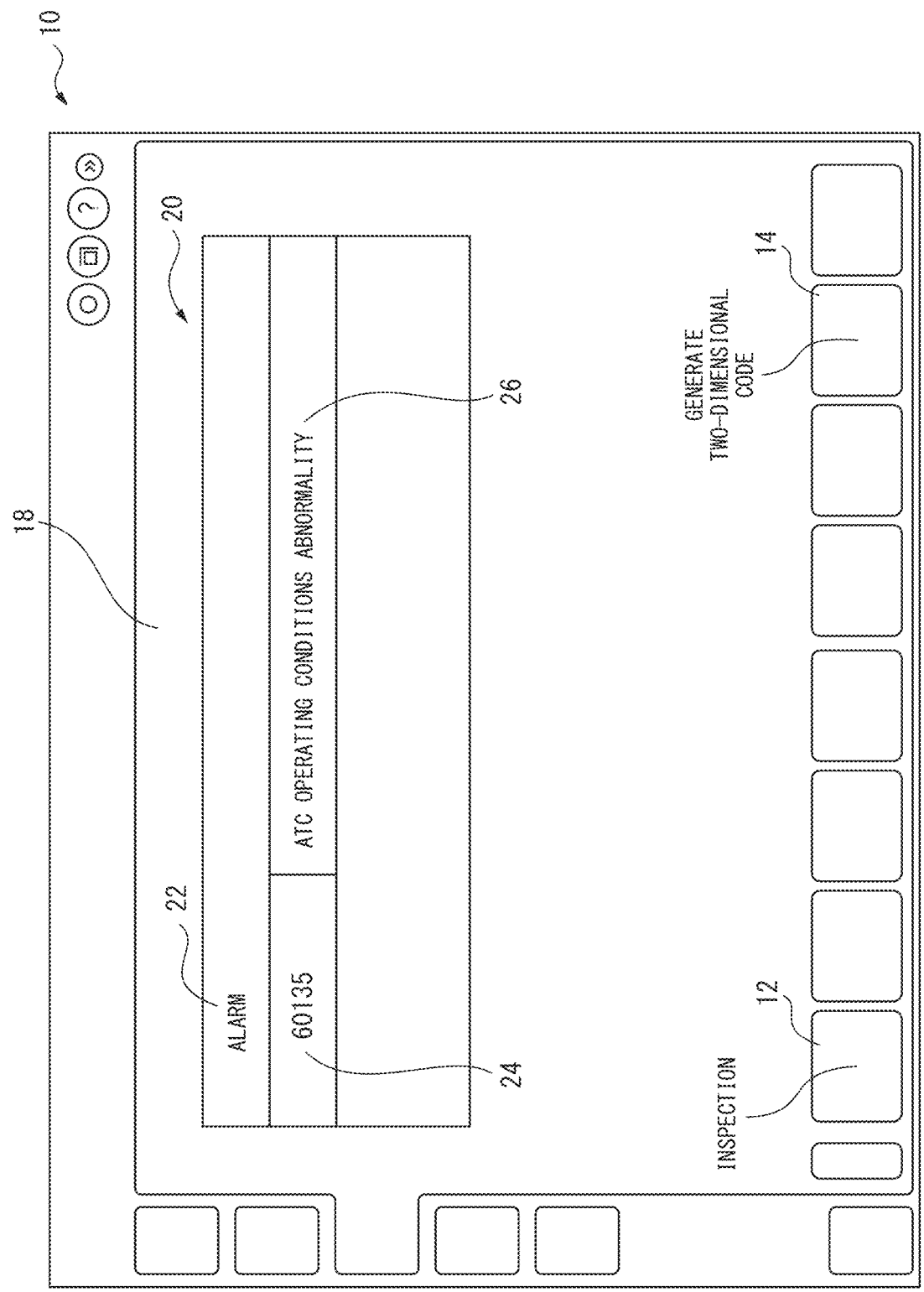
FIG. 2 is a view showing an example of an alarm window displayed on a display unit.

Referring to FIG. 2, the alarm window 20 includes an area 22 for displaying that this window is an alarm window, an area 24 for displaying an alarm code, which is a number corresponding to a malfunction item, and an area 26 for displaying malfunction items. In FIG. 2, "ATC operating conditions abnormality" is shown as the malfunction item. Examples of the malfunction items are shown in Table 1 along with alarm codes. Though only a single malfunction item is shown in FIG. 2, a plurality of malfunction items can be displayed.

TABLE 1

| Alarm Code | Item |
| --- | --- |
| 60131 | ATC Shutter Open Start Condition Abnormality (Operator Side Door Open) |
| 60132 | ATC Shutter Close Start Condition Abnormality (Operator Side Door Open) |
| 60133 | ATC Operation Start Condition Abnormality (Operator Side Door Open) |
| 60134 | Spindle Tool Clamp/Unclamp Operation Start Condition Abnormality (Operator Side Door Open) |
| 60135 | ATC Operation Start Condition Abnormality (Tool Magazine Manual Intervention) |
| 60136 | ATC Operation Condition Abnormality (TLS Door Open) |
| 60137 | ATC Operation Condition Abnormality (Spindle Tool Diameter/Length 0) |
| 60138 | ATC Operation Condition Abnormality (Spindle Tool Diameter 0) |
| 70047 | Spindle Command Abnormality |
| 70048 | Clamp Mechanism State Abnormality |
| 70049 | Spindle Start-Up Condition Abnormality |
| 70050 | Set Speed Abnormality |
| 70051 | Spindle Start-Up Condition Abnormality |
| 70052 | Spindle Start-Up Condition Abnormality |
| 70053 | Drawbar Probe Advancement Start Condition Abnormality |

TABLE 1-continued

| Alarm Code | Item |
|---|---|
| 70054 | Condition Abnormality During Drawbar Probe Advancement Operation |
| 920033 | Condition Abnormality During Pallet Change Operation (Time Limit Exceeded) |
| 920034 | Reconfirming Pallet Seating Confirmation |
| 920035 | Pallet Seating Confirmation Limit Switch Abnormality |
| 920036 | Pallet Seating Abnormality |
| 920037 | Pallet Seating Abnormality |
| 920040 | Condition Abnormality During Pallet Change Operation (Shaft Position) |

Figure 3:
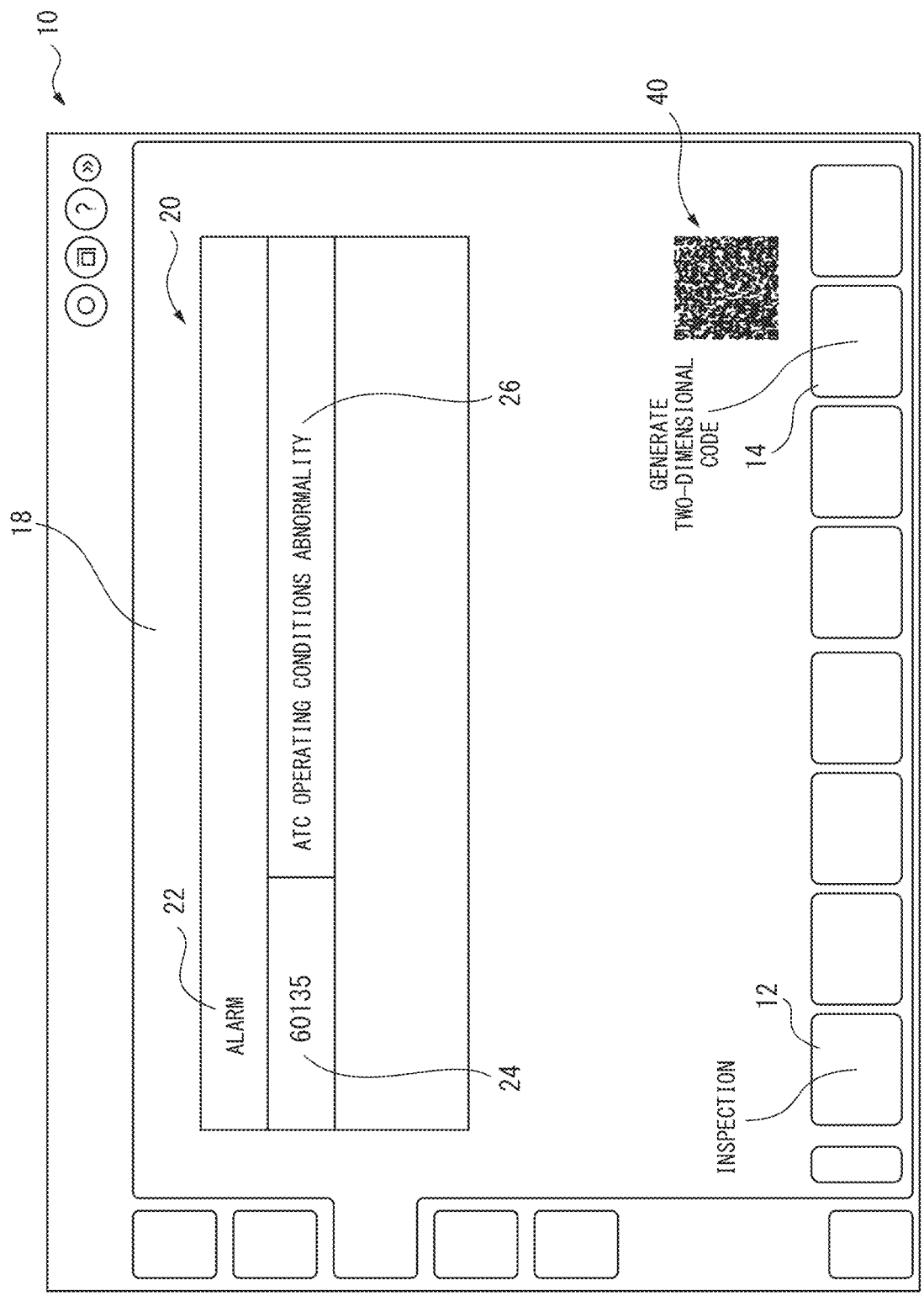
FIG. 3 is a view of the alarm window of FIG. 2 shown along with the inquiry code.

Furthermore, when the alarm window 20 is open, if the operator taps the inquiry code generation button 14, an inquiry code 40 is generated and displayed in the display area 18, as shown in FIG. 3. In FIG. 3, a two-dimensional code such as a QR code™ is illustrated as the inquiry code 40. The URL of the server 400, security information such as a username or account and password, the model number, serial number, and specification/optional functions of the machine tool 200, and an alarm code are stored in the inquiry code 40.

The operator runs an appropriate application for reading two-dimensional codes such as a QR code™, which is the inquiry code 40, on the manual display terminal 300, captures and decodes the inquiry code 40 with the camera 330, and accesses the server 400 via the Internet 110 using a general-purpose web browser. The server 400 specifies the username or account, as well as the model number, serial number, and specification/optional functions of the machine tool 200 from the information stored in the inquiry code 40, references the manual version database 430, and specifies the version of the instruction manual based on the specified information. When the inquiry code 40 contains an alarm code, the server 400 references the instruction manual database 420 further based on the alarm code, specifies the partial manual electronic file corresponding to the alarm code in the instruction manual of the corresponding version, and outputs the specified electronic file from the instruction manual database 420 to the web browser of the manual display terminal 300 via the Internet 110.

Furthermore, regarding each inspection item, the controller 250 of the machine tool 200 simply counts the time which has elapsed since the prior inspection or since the performance of a maintenance operation associated with an inspection for items executed irrespective of uptime, and counts the elapsed time in accordance with the uptime of the machine regarding items executed in accordance with the uptime of the machine. When the counted elapsed time reaches a value specified for an inspection item, the controller 250 displays the periodic inspection window 30 on the display unit 230 of the operation board 220. Alternatively, the periodic inspection window 30 may be displayed by the operator tapping the inspection button 12.

Figure 4:
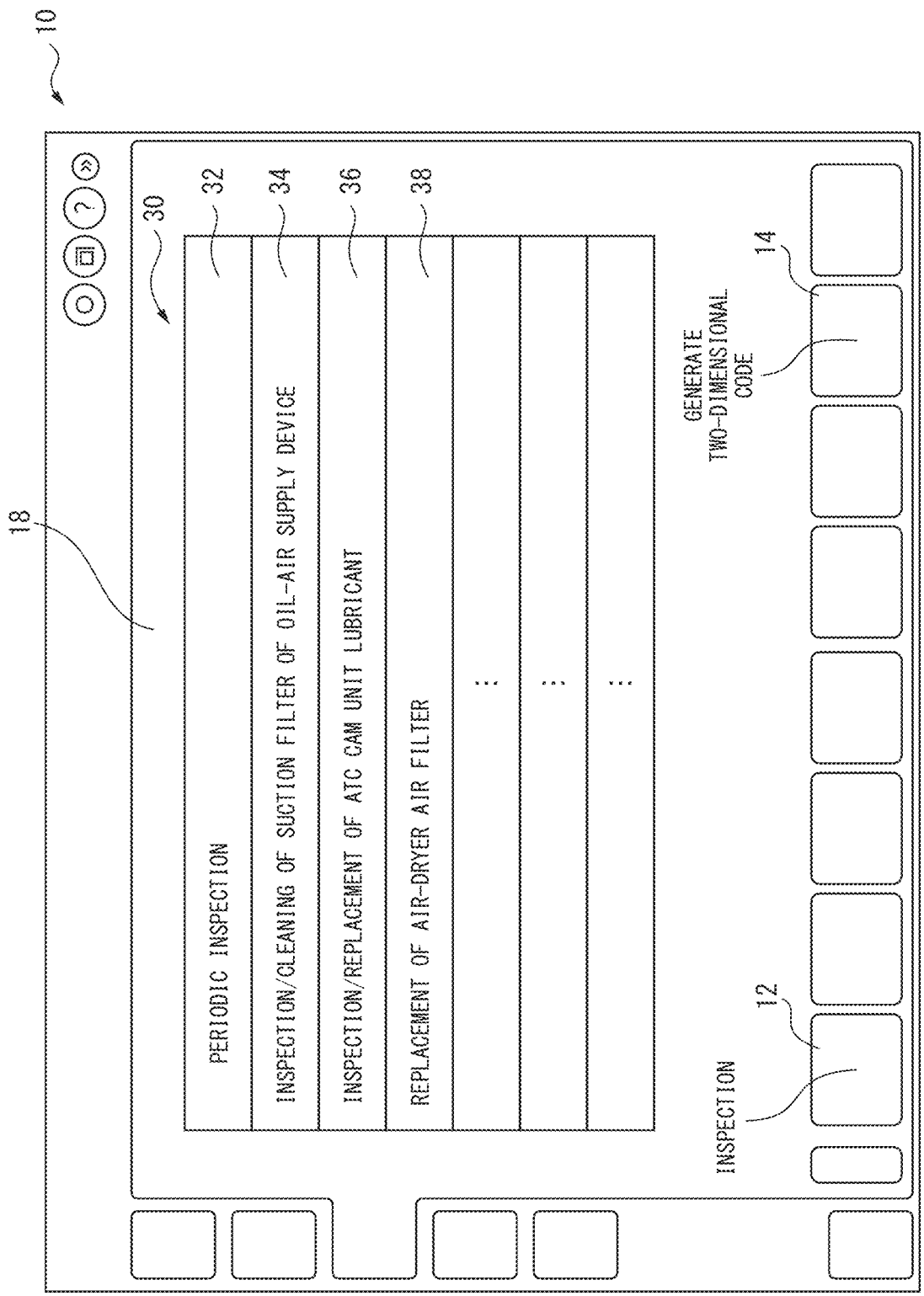
FIG. 4 is a view showing an example of a periodic inspection window displayed on the display unit.

The periodic inspection window 30 includes an area 32 for displaying that the window is a periodic inspection window, and areas for displaying inspection items 34 to 38. FIG. 4 shows "inspection/cleaning of suction filter of oil-air supply device", "inspection/replacement of ATC cam unit lubricant", and "air-dryer air filter replacement" as examples of inspection items. Examples of inspections items are shown in Table 2 along with inspection item codes.

TABLE 2

| 1000 | Please Clean ATC Shutter/ATC Arm |
|---|---|
| 1001 | Please Inspect ATC Cam Unit Lubricant Quantity, Replenish Lubricant as Needed |
| 1002 | Please Replace ATC Cam Unit Lubricant |
| 1003 | Please Inspect ATC Arm Unit Timing Belt |
| 1005 | Please Replace Air Dryer Air Filter |
| 1006 | Please Wash Air Dryer Auto Drain Strainer |
| 1007 | Please Inspect Air Dryer Heat Thermometer |
| 1008 | Please Clean Air Dryer Ventilation Duct |
| 1009 | Pleas Inspect Oil-Air Supply Device Lubricant Quantity, Replenish Lubricant as Needed |
| 1011 | Please Clean Oil-Air Supply Device Suction Filter |
| 1012 | Please Replace Oil-Air Supply Device Suction Filter |
| 1013 | Please Clean Oil-Air Supply Device Line Filter Element |
| 1014 | Please Replace Oil-Air Supply Device Line Filter |
| 1015 | Please Inspect X-Axis Cover Wiper |
| 1016 | Please Replace X-Axis Cover Wiper |
| 1017 | Please Apply Grease to Y-Axis Cover |
| 1023 | Please Inspect Seal of Measurement Probe of Automatic Workpiece Measurement Device |

Figure 5:
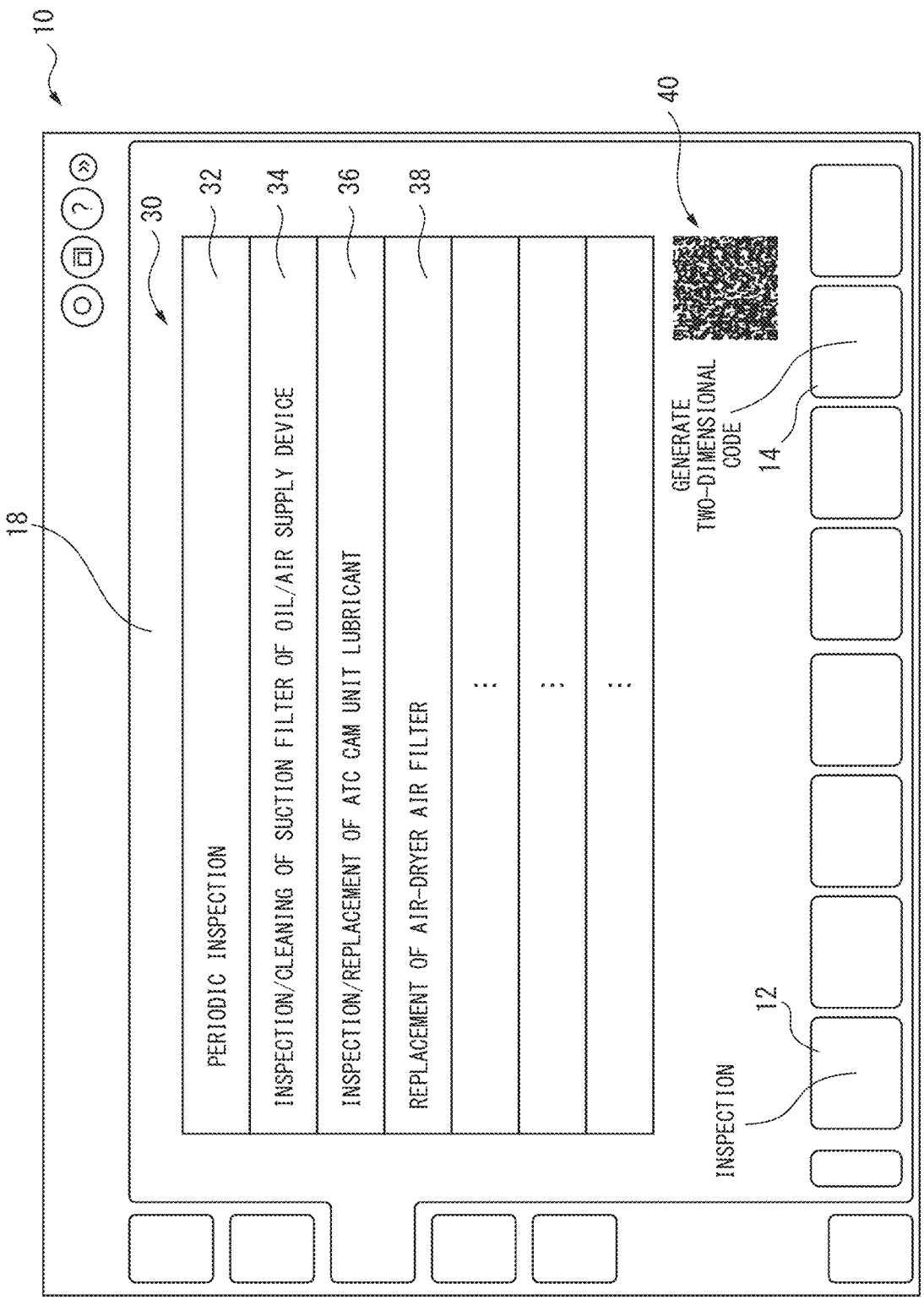
FIG. 5 is a view of the periodic inspection window of FIG. 4 shown along with the inquiry code.

When the periodic inspection window 30 is open, by tapping and selecting one item or a plurality of items from inspection items 34 to 38 and tapping the inquiry code generation button 14, the controller 250 (inquiry code generation unit) generates the inquiry code 40, as shown in FIG. 5, and displays it in the display area 18. The URL of the server 400, security information such as a username or account name and a password, the model number, serial number, and specification/optional functions of the machine tool 200, and the inspection item codes corresponding to the selected inspection items are stored in this inquiry code 40.

The operator captures and decodes the inquiry code 40 with the camera 330 of the manual display terminal 300 and accesses the server 400 via the Internet 110 using a general-purpose web browser. The server 400 references the manual version database 430 based on the user information stored in the inquiry code 40, specifies the version of the instruction manual, specifies the partial manual electronic files corresponding to the inspection item codes in the instruction manual of the corresponding version based on the inspection item codes, and outputs the files from the instruction manual database 420 to the web browser of the manual display terminal 300 via the Internet 110. At this time, in addition to partial manual electronic files, video files corresponding to the inspection item codes may be output to the manual display terminal 300.

Figure 6:
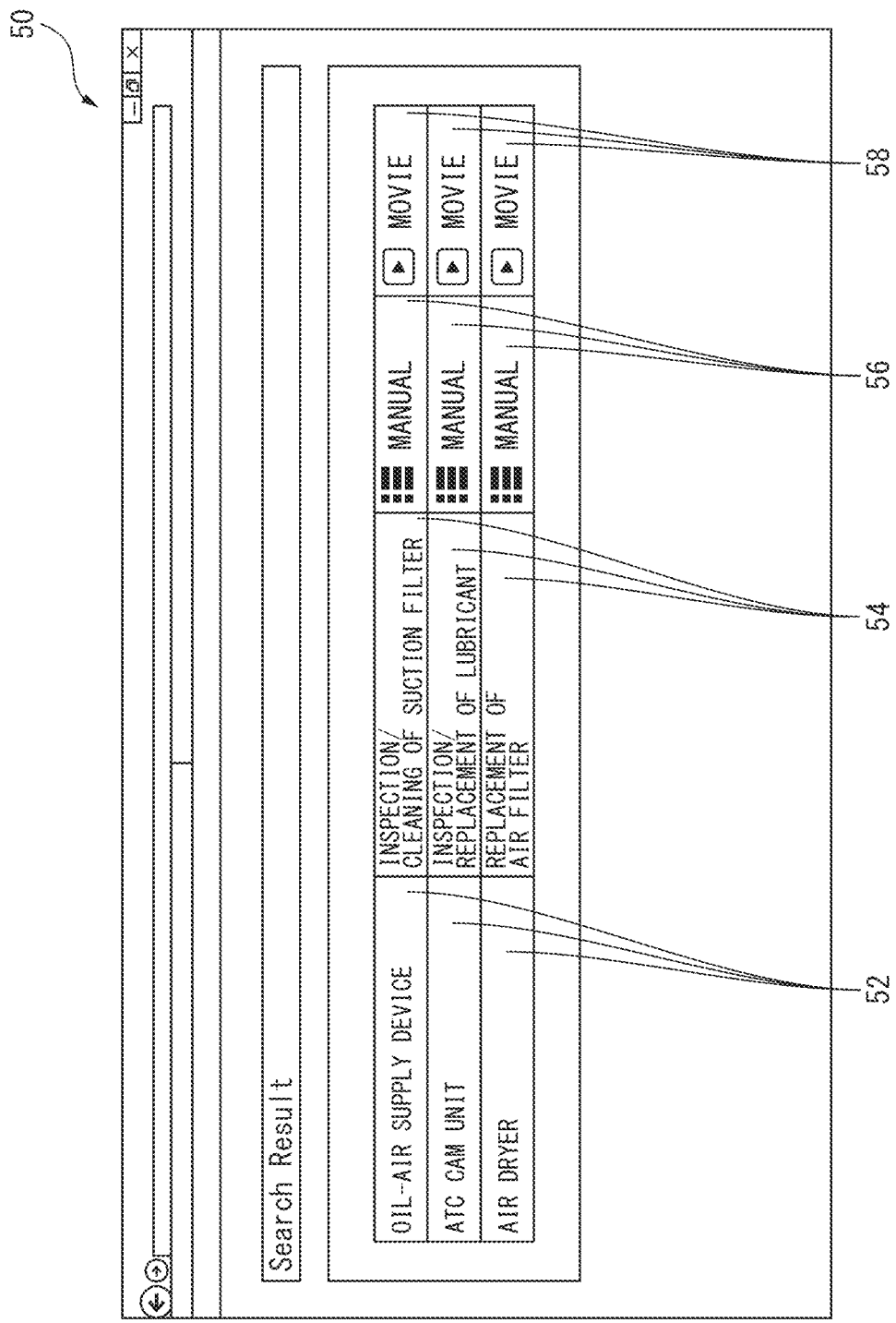
FIG. 6 is a view of a manual selection window displayed on a manual display terminal.

FIG. 6 shows the manual selection window 50 displayed on the manual display terminal 300 when the three items in the periodic inspection window 30 of FIG. 5 including the inspection item 34 "oil-air supply device suction filter inspection/cleaning", the inspection item 36 "ATC cam unit lubricant inspection/replacement", and the inspection item 38 "air dryer air filter replacement" are selected, an inquiry code 40 is generated, and the server 400 is accessed via the Internet by the manual display terminal 300 based on the inquiry code 40. The manual selection window 50 includes unit display areas 52, item display areas 54, manual display buttons 56, and movie play buttons 58. The names of the device units constituting the machine tool 200 are displayed in the unit display areas 52. In FIG. 6, "oil-air supply device", "ATC cam unit", and "air dyer" are displayed in the unit display areas 52 based on the inspection items selected in the periodic inspection window 30. The device units displayed in the unit display areas 52 include, for example, the spindle head, automatic grease supply device, pallet seating confirmation, ATC (automatic tool change) arm unit, ring type tool magazine, spindle cooling oil temperature controller, oil-air supply device, hydraulic device, pneumatic device, chip control/conveyor, cutting fluid supply device, splash guard, etc.

The item display areas 54 display inspection/maintenance items corresponding to the device units displayed in the unit display areas 52. In FIG. 6, "suction filter inspection/cleaning", "air filter replacement", and "lubricant inspection/replacement", which are the inspection items selected in the periodic inspection window 30, are shown in the item display areas 54. By tapping the manual display button adjacent to each item displayed in the item display areas 54, the corresponding partial manual electronic file is opened, and an inspection method or maintenance method is displayed. Further, by tapping the movie play button 58, a movie of a demonstration explaining the actual inspection and maintenance is played.

Though FIG. 6 shows the case in which the inquiry code 40 of FIG. 5, i.e., the manual corresponding to inspection/maintenance operations, is displayed (manual selection window 50), when the inquiry code 40 of FIG. 3, i.e., a manual related to alarm response or malfunction resolution operation when a malfunction occurs in the machine tool 200, is displayed, the manual is displayed on the manual display terminal 300 in the same manner By displaying the inquiry code 40 in the alarm window 20 or periodic inspection window 30 displayed on the display unit 230, reading the inquiry code 40 into the manual display terminal 300, and displaying the instruction manual on the manual display terminal 300, it is possible to provide the operator with information related to operations to resolve issues that have occurred in the machine tool 200 or inspection/maintenance operations at locations away from the display unit 230.

Though instruction manuals are displayed on the manual display terminal 300 in the embodiments described above, the instruction manuals may be displayed on a personal computer 500. In this case, the operator accesses the top page of the server 400 via the Internet 110 with the personal computer 500 and manually inputs their username or account name and password. The server 400 references the user information database 410 and displays a list of machine tools operated by the user along with their model numbers, serial numbers, and specifications/optional functions. When the operator selects a target machine tool as an item from the list, the server 400 references the manual version database 430 to specify the corresponding manual identification number, and outputs the corresponding electronic file from the instruction manual database 420 to the personal computer 500.

REFERENCE SIGNS LIST

10 main window
30 periodic inspection window
50 manual selection window
100 electronic manual system
110 Internet
200 machine tool
210 machining device
220 operation board
230 display unit
240 operation button
250 controller
300 manual display terminal
310 wireless communication unit
320 display unit
330 camera
400 server
410 user information database
420 instruction manual database
430 manual version database
500 personal computer

The invention claimed is:

1. A machine tool electronic manual system configured to acquire from a network-connected server and display an electronic manual including information associated with operations and maintenance of a machine tool, the system comprising:
   a server having a user information database which stores at least machine tool information and user identification information in association with each other, and an instruction manual database which stores electronic data of instruction manuals in association with model numbers, serial numbers, and specifications of machine tools operated by a user, and one or more versions or manual identification codes of the instruction manuals,
   a machine controller configured to generate an inquiry code based on information about the user including at least a serial number or specification of the machine tool,
   an operation board, provided on the machine tool, configured to allow an operator to operate the machine tool,
   a display unit, provided in the operation board, configured to display the inquiry code in an alarm window or a periodic inspection window, and
   a manual display terminal having a camera configured to capture the inquiry code displayed on the display unit of the machine tool, and a manual display unit configured to display the electronic manual,
   wherein the manual display terminal is configured to access the server via a communication network and search the instruction manual database based on the inquiry code captured by the camera, and acquire the electronic manual of the version or manual identification code for the machine tool, and
   wherein the manual display terminal accesses the electronic manual to display information related to operations to resolve issues that have occurred in the machine tool or inspection/maintenance operations on the manual display unit of the manual display terminal based on the inquiry code.

2. The machine tool electronic manual system of claim 1, wherein the server comprises a manual version database which stores manual identification codes of the instruction manuals in association with a user account or username and model numbers or serial numbers of the machine tools operated or managed by the user.

3. The machine tool electronic manual system of claim 1, wherein the electronic data of the instruction manuals stored in the instruction manual database is divided into a plurality of electronic files for each item in association with a plurality of items.

4. The machine tool electronic manual system of claim 3, wherein the electronic files for each of the plurality of items are stored in association with an alarm code and a maintenance code generated by the machine tool.

* * * * *